(12) United States Patent
Schueler et al.

(10) Patent No.: US 11,107,011 B2
(45) Date of Patent: Aug. 31, 2021

(54) SYSTEM AND DEVICES FOR MANAGEMENT OF TIMED EVENT ADMISSIONS

(71) Applicants: Cody James Schueler, Coeur d'Alene, ID (US); Luke Maleroy Schueler, Coeur d'Alene, ID (US); Chia (Carl) Yang (Foo), Hong Kong (HK)

(72) Inventors: Cody James Schueler, Coeur d'Alene, ID (US); Luke Maleroy Schueler, Coeur d'Alene, ID (US); Chia (Carl) Yang (Foo), Hong Kong (HK)

( * ) Notice: Subject to any disclaimer, the term of this patent is extended or adjusted under 35 U.S.C. 154(b) by 397 days.

(21) Appl. No.: 16/231,537

(22) Filed: Dec. 23, 2018

(65) Prior Publication Data
US 2020/0202259 A1 Jun. 25, 2020

(51) Int. Cl.
*G06Q 10/02* (2012.01)
*G06Q 10/06* (2012.01)
*G06K 7/10* (2006.01)
*G06K 19/077* (2006.01)
*G06Q 20/32* (2012.01)

(52) U.S. Cl.
CPC ......... *G06Q 10/02* (2013.01); *G06K 7/10297* (2013.01); *G06K 19/07773* (2013.01); *G06Q 10/06393* (2013.01); *G06Q 20/32* (2013.01)

(58) Field of Classification Search
CPC .. G06Q 10/02; G06Q 10/06393; G06Q 20/32; G06K 7/10297; G06K 19/07773
See application file for complete search history.

(56) References Cited

U.S. PATENT DOCUMENTS

| 7,204,425 B2 | 4/2007 | Mosher, Jr. et al. |
| 7,849,619 B2 | 12/2010 | Mosher, Jr. et al. |
| 8,006,899 B2 | 8/2011 | Wein |

(Continued)

FOREIGN PATENT DOCUMENTS

| CN | 106263314 A | * | 1/2017 | ............... A44C 5/00 |
| CN | 206275263 U | * | 6/2017 | ............... A44C 5/00 |
| KR | 10-2010-0030917 | * | 3/2010 | ............... H04B 5/02 |

OTHER PUBLICATIONS

PR Newswire, Ticket Information & On Sale Dates Announced for the 5th Annual Electric Forest Festival, Jun. 25-28, 2015: 23-Hour Loyalty priced GA and Good Life VIP Village Wristbands on sale beginning December 9 at 12PM EST, General public on sale begins Dec. 10 at 12 PM EST at.*

(Continued)

*Primary Examiner* — Nathan Erb
(74) *Attorney, Agent, or Firm* — Antoinette M. Tease

(57) ABSTRACT

A system for management of admission to venues that charge by time with a handheld scanner, wristband, module, magnetic key, and lock. The wristband is made of a flexible, thermoplastic elastomer material, and the module fits into a pod in the center of the wristband. The top polycarbonate plate of the module has a plurality of nodes that extend upward into and through holes in the center portion of the wristband to create an impression of multiple LED lights. A time command signal is communicated from the handheld scanner to the module depending on which timer button on the scanner is activated. The magnetic lock and key are configured to lock and unlock the wristband. The optional docking station is configured to charge the wristband batteries.

18 Claims, 14 Drawing Sheets

(56) References Cited

U.S. PATENT DOCUMENTS

| | | |
|---|---|---|
| 9,109,763 B1 | 8/2015 | Wein |
| 9,111,184 B2 | 8/2015 | Wein |
| 9,153,082 B2 | 10/2015 | Martinez |
| 9,474,137 B1 | 10/2016 | Wein |
| 9,485,841 B1 | 11/2016 | Wein |
| 9,589,396 B2 | 3/2017 | Martinez |
| 9,888,550 B2 | 2/2018 | Wein |
| 9,942,968 B2 | 4/2018 | Wein |
| 10,037,053 B2 | 7/2018 | Malhotra |
| 2003/0173408 A1 | 9/2003 | Mosher, Jr. et al. |
| 2005/0168340 A1 | 8/2005 | Mosher, Jr. et al. |
| 2006/0092002 A1* | 5/2006 | Finkelstein ............ B60R 25/33 340/426.19 |
| 2007/0017136 A1 | 1/2007 | Mosher, Jr. et al. |
| 2011/0024499 A1 | 2/2011 | Wein |
| 2012/0162971 A1 | 7/2012 | Wein |
| 2013/0024219 A1* | 1/2013 | Martinez ............ G07C 9/00944 705/5 |
| 2013/0121015 A1* | 5/2013 | Tjalsma ............ A44C 15/0015 362/570 |
| 2014/0184386 A1 | 7/2014 | Regler et al. |
| 2016/0070393 A1* | 3/2016 | Sharma ............ A61B 5/7264 345/174 |
| 2016/0098872 A1 | 4/2016 | Martinez |
| 2017/0019257 A1* | 1/2017 | Shibutani ............ H04W 4/80 |
| 2017/0024713 A1 | 1/2017 | May et al. |
| 2017/0309095 A1 | 10/2017 | Martinez |
| 2017/0328089 A1* | 11/2017 | Willie ............ E05B 73/0017 |
| 2017/0351295 A1 | 12/2017 | Malhotra |
| 2018/0014385 A1 | 1/2018 | Wein |
| 2018/0018593 A1 | 1/2018 | Benavides et al. |
| 2018/0018596 A1 | 1/2018 | Siegel |
| 2018/0018597 A1 | 1/2018 | Siegel |
| 2018/0018598 A1 | 1/2018 | Siegel |
| 2018/0027629 A1 | 1/2018 | Wein |
| 2018/0182193 A1* | 6/2018 | Spittle ............ G06Q 20/321 |
| 2018/0224804 A1* | 8/2018 | Berardinelli ......... G04G 99/006 |
| 2019/0043281 A1* | 2/2019 | Aman ............ G07C 9/00896 |
| 2019/0216382 A1* | 7/2019 | Baldwin ............ A61B 5/165 |
| 2019/0355191 A1* | 11/2019 | Jones ............ G06K 7/1417 |

OTHER PUBLICATIONS

[Item U continued] www.electricforestfestival.com, PR Newswire Association LLC, New York, Dec. 2014.*

* cited by examiner

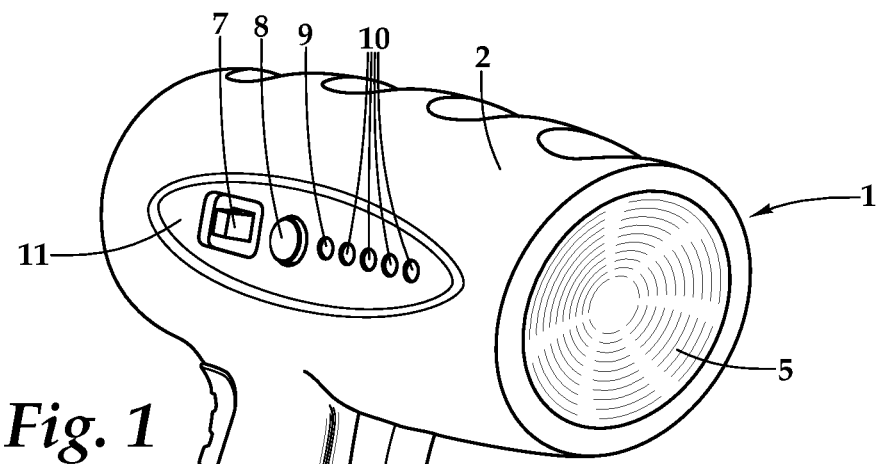
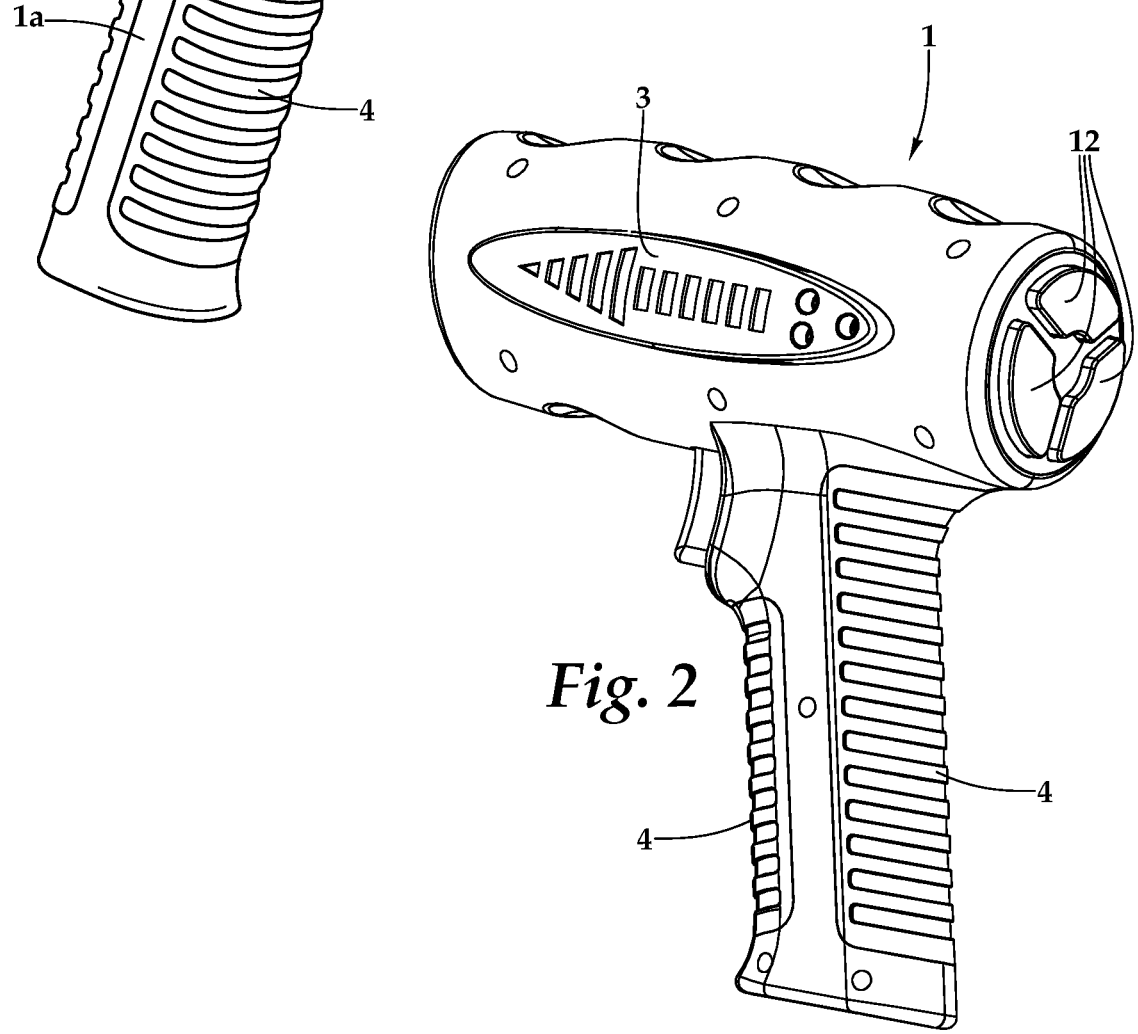

SYSTEM AND DEVICES FOR MANAGEMENT OF TIMED EVENT ADMISSIONS

BACKGROUND OF THE INVENTION

1. Field of the Invention.

The present invention relates generally to the field of event admissions, and more particularly, to a system and devices for management of admissions to attractions or events that charge visitors or participants by time.

2. Description of the Related Art.

Attractions or events that admit and charge individuals based on a particular duration of time (e.g., 30 minutes, 60 minutes, etc.) need a way to track how much time each individual has paid for and when that time period expires. Ideally, the venue owner would also know when patrons have left early (that is, prior to expiration of their allotted time) so that he can sell the unused time to another customer, thereby maximizing his revenue. Current methods of tracking allotted time by colored wristbands or stickers do not provide this kind of information or afford this level of flexibility. Specifically, existing methods are not able to keep track of who has left early unless the customer checks out through a point of sale ("POS") system. The present invention provides the ability to sell unused maximum capacity of a facility individually by the minute and not in bulk bathes like 15-, 30- or 60-minute increments.

Furthermore, conventional wristbands or stickers are not viewable by security cameras or employees during operating hours, nor are they visible during cosmic night or glow-in-the-dark events. The inability to see who has been properly admitted and who has not may lead to security violations, increased liability, and/or loss of revenue for the venue owner/operator. As a practical matter, it is virtually impossible for an employee to confirm the time printed on the wristband or sticker for each and every individual who has been admitted to the event. This lack of visibility may lead to over-occupancy, which creates safety issues for customers and liability issues for the owner/operator.

If an attraction is sold out when a customer seeks admission, the customer will typically leave and come back later to inquire as to whether there is a new time slot available. Conventional wristbands or stickers do not allow customers to pay for admission up front (even if there is no time slot available at that time) and to receive notification when their time slot is available. With the present invention, a customer can pay in advance, don the wristband, and then return to the venue when notified via the wristband that a time slot is available. This delayed individual activation of the wristband is a function that is only possible of the present invention is used with a POS system that is keeping record of current capacity in real time.

Although a number of systems and methods have been invented to deal with the management of venue admissions and/or the identification and tracking of individuals, none provides all of the advantages or possesses the unique structural features of the present invention. U.S. Pat. No. 7,204,425 (Mosher, Jr. et al., 2007) discloses an enhanced identification appliance, such as a wristband, bracelet, headband, card, sticker or other wearable device, with various sensors, opto-electronics and/or security features. When the fastener is closed, the electronic circuit is enabled, and the circuit erases or modifies identification information if it senses that the appliance has been tampered with. The appliance monitors the location or determine the identity of vehicle passengers. In one embodiment, a biometric sensor includes a light-emitting device that emits light toward the person and a light sensing device that measures light reflection off the person to obtain a fingerprint characteristic.

U.S. Pat. No. 7,849,619 (Mosher, Jr. el al., 2010) provides an identification appliance comprised of an elongated structure (such as a wristband) with a circuit disposed on or in it, first and second connectors, and a data storage device. The circuit receives biometric information about the person wearing the appliance from an external source. The appliance erases the biometric information if and when the first and second connectors are disconnected and stores the biometric information on the data storage device when the connectors are re-engaged.

U.S. Patent Application Pub. No. 2005/0168340 (Mosher, Jr. et al.) describes a method of verifying whether the possessor of an identification appliance is its authorized bearer. The method comprises retrieving biometric data of the bearer that was previously stored in a circuit in the appliance, obtaining current biometric data from the wearer, and determining whether the previously stored and current data are associated with the same person.

U.S. Pat. Nos. 8,006,899 (Wein, 2011), 9,109,763 (Wein, 2015), 9,111,184 (Wein, 2005), 9,474,137 (Wein, 2016), 9,485,841 (Wein, 2016) and 9,888,550 (Wein, 2018) are all related patent filings. With the exception of the '137 patent, all of these patents disclose a ticket with an embedded processor in a substrate for creating a synchronous lighting effect at a controlled access venue and a method for creating a lighting effect at a venue while simultaneously controlling access to the venue. The '137 patent discloses a networked collaborative lighting effect system for an event at a venue in which a plurality of portable collaborative lighting devices receive commands from a network, which can include commands from a disc jockey connected to the network at the venue. Each portable device has an RFID chip for encoding wearer information including financial information.

U.S. Pat. Nos. 9,153,082 (Martinez, 2015) and 9,589,396 (Martinez, 2017) and U.S. Patent Application Pub. No. 20170309095 (Martinez) provide a method and device for allowing admission of a spectator to a special admission zone with a view to a performance stage for a predefined duration of time. The special admission zone is usable by multiple spectators in multiple successive time periods during the same performance. The admission certificate may be in the form of an RFID-equipped wristband. Each RFID chip is electronically encoded with a unique serial number that is electronically associated with one of a plurality of predefined time periods. The total number of wristbands that are assigned serial numbers for all of the predefined time periods is a multiple of the fixed maximum capacity of the special admission zone.

U.S. Pat. No. 10,037,053 (Malhotra, 2018) describes a wearable device assembly with a housing that supports a controller and a display. The display has one or more light guides, each of which is operatively coupled to an LED. The controller selectively illuminates the one or more light guides using LEDs to indicate a level of activity of the user and adjusts the intensity of the light emitted from the lighting elements.

U.S. Patent Application Pub. No. 20140184386 (Regler et al.) provides a wristband with an RF receiver that receives data bursts from a transmitter. A controller interprets the data bursts to recover embedded activation codes that control operation of either individual wristbands or a selected group of similar wristbands worn by members of an audience at a venue or event. Each wristband includes multiple LEDs.

When a data burst is addressed to the wristband, an activation code from the data burst is cross-referenced against LED control sequences stored in a memory in the wristband, which causes selective illumination of the LEDs to produce a light show within wristbands worn by the audience. Circuitry within the wristband includes a timer or clock that is coupled to the controller to synchronize lighting effects.

U.S. Patent Application Pub. No. 20180018593 (Benavides et al.) describes a system and method for expedited identification verification and biometric monitoring. The method includes receiving a request to purchase an admission to an event at a specific venue, storing the request, user/payment data and device identifier in a database, receiving a notification of the device via a sensor located within the venue, and updating the payment method to reflect a deduction of the price for the event associated with the location determined by the sensor. In one embodiment, individuals using public transportation or public venues are issued a wearable, uniquely identified device such as a smart bracelet. The smart bracelet is issued at a ticketing counter and associated with the individual along with ticketing information related to date, time, location, and/or venue. The person wears the bracelet to a boarding gate or location, and business rules alert security personnel if the individual is not at a proper location for the scheduled travel/event or within a reasonable time frame of departure or start of the event.

U.S. Patent Application Pub. No. 20170024713 (May et al.) discloses wearable devices and systems for event administration and event-related transactions in which wristbands, mobile devices, cards or the like are provided for facilitating various transactions at events. Each attendee is given a wearable device with unique identification that is used to gain access to various parts of the event and make purchases from vendors. In one embodiment, the system communicates a photo of the user to the vendor and processes a payment request.

U.S. Patent Application Pub. Nos. 20180018596 (Siegel), 20180018597 (Siegel), and 20180018598 (Siegel) are related patent filings, all of which pertain to a system and method for providing a tertiary market for used tickets. In this invention, the tickets of "early exits" are resold to later attendees who wish to attend the remaining duration of the event. The method includes electronically tracking when the ticket holder has left the event, electronically offering for resale the right to occupy a previously vacated seat, electronically processing the resale of the right to occupy the seat, electronically transmitting a ticket representing the resold right to occupy the seat, and electronically transmitting to the venue a record of the ticket representing the resole right to occupy the previously vacated seat.

BRIEF SUMMARY OF THE INVENTION

The present invention is a system for management of admission to venues that charge by time comprising: a handheld scanner; a wristband; a module; a magnetic key; and a lock; wherein the wristband is comprised of a flexible, thermoplastic elastomer material; wherein the wristband comprises a center portion that forms a pod that is configured to receive the module; wherein the module comprises a first polycarbonate plate and a second polycarbonate plate; wherein the first polycarbonate plate comprises a plurality of holes corresponding in number and size to a plurality of nodes on an outer surface of the first polycarbonate plate; wherein the module comprise an LED; wherein the handheld scanner comprises a first RFID antenna; wherein the module comprises a second RFID antenna; wherein the handheld scanner is configured to transmit data to the module and the module is configured to receive data from the handheld scanner; wherein the handheld scanner comprises two or more timer buttons; wherein each timer button corresponds to a preset duration of time; wherein, depending on which timer button is activated, the handheld scanner sends a particular time command signal to the module; and wherein the magnetic lock and key are configured to lock and unlock the wristband on a wrist of a user.

In a preferred embodiment, the invention further comprises a docking station; wherein the docking station is configured to support a plurality of wristbands; wherein the docking station comprises a first end, a second end, and a top side; wherein the first end of the docking station comprises a female electrical connector; wherein the second end of the docking station comprises a male electrical connector; wherein the top side of the docking station is configured to provide a plurality of wells; wherein each well is configured to receive the center portion of the wristband; and wherein each well comprises a pair of electrical conduits that are configured to fit into a pair of electrical ports on a rear side of the module for charging purposes.

In a preferred embodiment, the handheld scanner comprises a housing with a concave front end; and an outer surface of the center portion of the wristband is convex in shape and configured to correspond in shape and size to the concave surface of the front end of the housing of the handheld scanner. Preferably, the pod comprises side walls; and the side walls of the pod encircle the module.

In a preferred embodiment, the housing of the handheld scanner comprises a first side and a second side; the first side of the housing comprises a belt clip; and the second side of the housing comprises a power switch, a charge button, a power indicator light, and a plurality of battery power level indicator lights. Preferably, the power switch, the charge button, the power indicator light, and the plurality of battery power level indicator lights are situated within a recess in the second side of the scanner.

In a preferred embodiment, the handheld scanner comprises a body and a handle; and the timer set buttons are situated on a rear end of the scanner body. Preferably, the thermoplastic elastomer material of the wristband has a hardness rating of Shore 80A.

In a preferred embodiment, the handheld scanner comprises a printed circuit board; wherein the printed circuit board has a first side and a second side; wherein the first side of the printed circuit board comprises a charge IC, a first switch, a power button, and a plurality of indicator lights; wherein the handheld scanner further comprises a motor that is situated atop the printed circuit board; wherein the second side of the printed circuit board comprises a microcontroller unit and an RFID reader/writer chip; and wherein the first RFID antenna is situated inside the front end of the housing directly behind the concave surface. Preferably, the bottom end of the handle comprises a USB port; and the handheld scanner further comprises a USB adapter located inside a bottom end of the handle adjacent to the USB port.

In a preferred embodiment, the module comprises a battery and a printed circuit board; wherein the printed circuit board has a first side and a second side; wherein the first side of the printed circuit board comprises a microcontroller unit, an RFID tag chip, a charge IC, a power management chip, and a light emitting diode; wherein the second RFID antenna is in the shape of a ring corresponding to a perimeter of the module; and wherein the second RFID antenna is situated inside the module between the first polycarbonate plate and the printed circuit board. The first polycarbonate plate is preferably translucent. Preferably, the second polycarbonate plate forms a rear side of the module; and the rear side of the module comprises a pair of electrical ports for charging the module battery. Preferably, metal contact pins are molded into the second polycarbonate plate; and the metal contact pins are connected to the bottom surface of the printed circuit board with wires.

In a preferred embodiment, the wristband comprises a first end and a second end; wherein the first and second ends of the wristband are configured to form a clasp; wherein the clasp comprises a pin that extends outwardly from a first end of the wristband; wherein the wristband comprises a plurality of apertures extending from the center portion of the wristband to a second end of the wristband; wherein the lock comprises a plurality of ball bearings that are situated within a circumferential concavity in an outward end of the pin when the clasp is in a locked position; wherein the lock further comprises an internal lock housing, a platform, a lock ceiling, and an internal spring; wherein the platform is situated between the spring and the ball bearings; wherein the platform is configured to move within the lock and compress the spring when the ball bearings are drawn magnetically to the key; wherein the spring is configured exert pressure on the platform, thereby moving the ball bearings away from the lock ceiling when the magnetic force of the key is removed; and wherein the internal lock housing is configured to surround the ball bearings and prevent them from moving outwardly until and unless the platform moves toward the lock ceiling.

In a preferred embodiment, lock has an outside diameter; the pin has a base with an outside diameter; and the ratio of the outside diameter of the lock to the outside diameter of the base of the pin is approximately 6.5:1. In another preferred embodiment, the module has an outside ratio; the center portion of the wristband has an inside diameter; and the ratio of the outside diameter of the module to the inside diameter of the center portion of the wristband is approximately 1.3:1.

In a preferred embodiment, the LED of the module is programmed to display preset light sequences based on time periods corresponding to the timer buttons.

BRIEF DESCRIPTION OF THE DRAWINGS

FIG. 1 is a first perspective view of the handheld scanner of the present invention.

FIG. 2 is a second perspective view of the handheld scanner of the present invention.

REFERENCE NUMBERS

Figure 3:
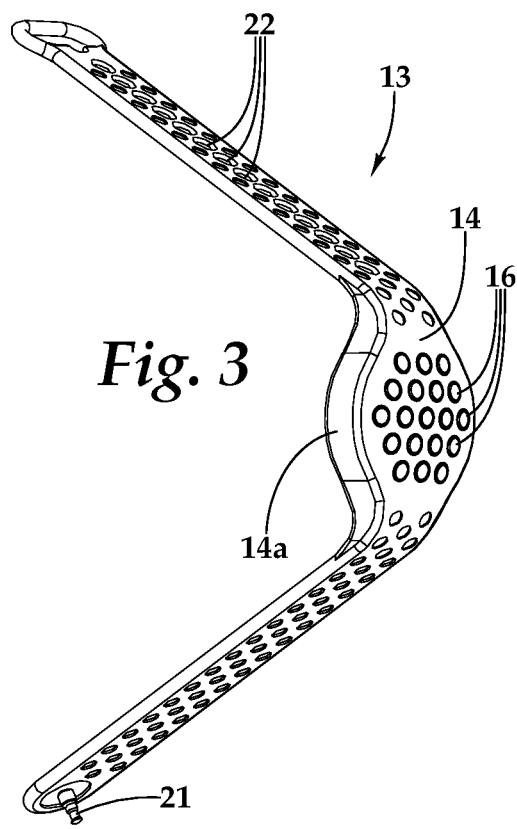
FIG. 3 is a front perspective view of the wristband of the present invention shown with the module installed.

1 Handheld scanner
1a Handle
2 Body
3 Belt clip
4 Gripping material
4a Trigger
5 Concave surface (on front end of body)
6 Module
7 First switch
8 Power button
9 Power indicator light
10 Battery power level indicator lights
11 Recess (on side of body)
12 Circumferentially oriented buttons
13 Wristband
14 Center portion
14a Side walls (of center portion)
15 Holes (in center portion)
16 Node
17 Magnetic key
18 Spring cord
19 Clip
20 Clasp
21 Pin
21a Circumferential concavity
21b Internal lock housing
22 Aperture (in wristband)
23 Lock
23a Ceiling (of lock)
24 Ball bearings
25 Spring
26 Platform
26a Legs (of platform)

27 Docking station
28 Female electrical connector
29 Male electrical connector
30 Well (in docking station)
31 Electrical conduits
32 Electrical ports
33 Printed circuit board (handheld scanner)
34 Charge IC
35 First RFID antenna
36 Second switch
37 Motor
38 Microcontroller unit
39 RFID reader/writer chip
40 Battery
41 Printed circuit board (module)
42 Microcontroller unit
43 RFID tag chip
44 Charge IC
45 Charge USB adapter
46 USB port
47 Second RFID antenna
48 Bracket
49 Cutout
50 Power management chip
51 Light emitting diode (LED)
52 First polycarbonate plate
53 Screw
54 Second polycarbonate plate
55 Metal contact pin
56 Wire
57 First crystal oscillator
58 Second crystal oscillator
59 Lithium polymer battery
60 Battery charge controller

DETAILED DESCRIPTION OF INVENTION

A. Overview

The present invention is a visual time-based management system that incorporates a portable scanner, wristband and docking station. This hardware works in conjunction with an existing POS system to admit, monitor and terminate admissions based on the duration of time for which the user has paid. This system is designed for use in any entertainment facility or other venue that charges individual users by time. These entertainment facilities include, but are not limited to, trampoline parks, water parks, adventure playgrounds, and ice rinks.

One problem solved by the present invention is the inability to sell time-based activities or services on a per-minute basis on a mass scale. The present invention solves this problem by allowing time-based attractions to be sold by the minute instead of in 15-, 30- or 60-minute increments, thus eliminating the issue of time being given away if the patron arrives in between time slots.

Another problem solved by the present invention is the inability to track maximum capacity by the minute. The present invention solves this problem by informing the operator as to the number of customers present at any given time (rather than, for example, only every 30 minutes).

Another problem solved by the present invention is the inability to sell to maximum capacity due to lack of information on a minute-by-minute basis as to how many authorized users are in the venue. The present invention solves this problem by tracking the number of authorized users at all times, allowing full capacity during all operating hours.

Another problem solved by the present invention is the inability to retain customers if time slots are sold out. The present invention solves this problem by providing a delayed start time function whereby customers can purchase time for the attraction in advance or during sold out periods, giving them the option to leave and receive notification when their time slot is available.

Another problem solved by the present invention is the inability of security cameras to record the color of conventional (TYVEK® or paper) wristbands or stickers. The present invention includes a wristband with light emitting diodes (LEDs) that are easily detected by security cameras and staff to ensure that all patrons on the attraction are authorized.

Another problem solved by the present invention is the removal and reuse of wristbands by unauthorized users. The LED wristband of the present invention can only be activated by the POS system or portable scanner, which eliminates fraud and re-use.

Another problem solved by the present invention is the lack of accurate sales reconciliation. With the present invention, data analytics can be exported for accurate sales reconciliations and various reports, including, but not limited to, number of users per hour throughout the day on an exact time basis.

B. Detailed Description of the Figures

FIG. 1 is a first perspective view of the handheld scanner of the present invention. As shown in this figure, the invention comprises a handheld scanner 1 with a contiguous housing that forms a handle 1a and a body 2. A first side of the body 2 preferably comprises a laterally oriented belt clip 3. The handle 1 is substantially perpendicular to the body 2, and the handle 1 preferably comprises a gripping material 4 on the front and rear sides of the handle. The gripping material 4 may be comprised of any suitable material, for example, rubber or thermoplastic. In a preferred embodiment, the front end of the body 2 forms a concave surface 5 that is configured to accept the convex outer surface of the center portion of the wristband (see FIG. 7). This particular configuration facilitates activation of the module 6, as described below.

FIG. 2 is a second perspective view of the handheld scanner of the present invention. As shown in this figure, the scanner comprises a trigger 4a that is used to activate the module 6 (see FIGS. 3-6). A second side of the body 2 comprises a first switch 7 that turns the power to the scanner on and off, a charge button 8, a power indicator light 9, and a plurality of battery power level indicator lights 10. The first switch 7, charge button 8, and lights 9, 10 are all preferably situated within a recess 11 in the body housing. In a preferred embodiment, the rear end of the handheld scanner 1 comprises three circumferentially oriented timer set buttons 12, each of which corresponds to a particular time period (for example, 60 minutes, 90 minutes and 120 minutes). These buttons determine for how long the module 6 will be activated.

Figure 4:
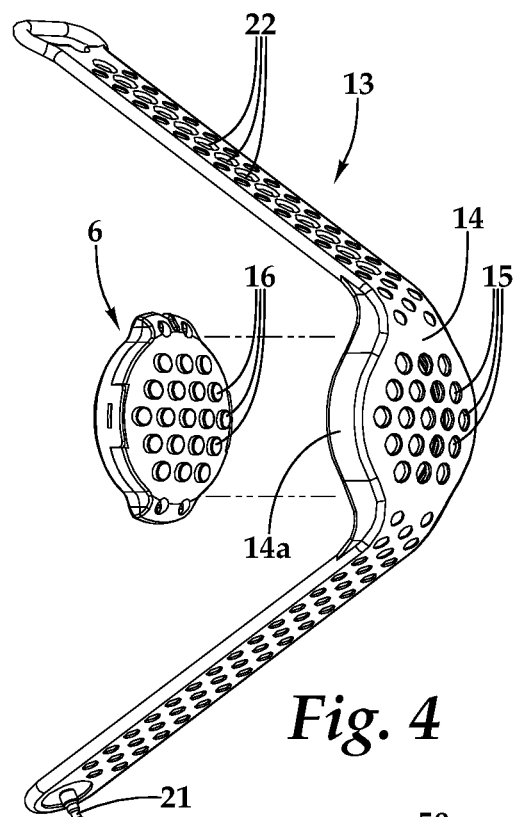
FIG. 4 is a front perspective view of the wristband of the present invention shown with the module removed.

FIG. 3 is a front perspective view of the wristband of the present invention shown with the module installed, and FIG. 4 is a front perspective view of the wristband of the present invention shown with the module removed. The wristband 13 is preferably comprised of a flexible, thermoplastic elastomer material with a hardness rating of Shore 80A, which allows for the required flexibility and stretch to enable the module to fit within the center portion 14 of the wristband 13. The module 6 is preferably removable so that it can be replaced with dirt and wear. As noted above, the outer surface of the center portion 14 of the wristband 13 is convex in shape and configured to correspond in shape and size to the concave surface of the front end of the body of the handheld scanner. The center portion 14 of the wristband 13 comprises a plurality of holes 15 through which nodes 16 on the first polycarbonate plate 52 of the module 6 protrude when the module is installed inside the center portion of the wristband 13 (see FIG. 9B).

Figure 5:
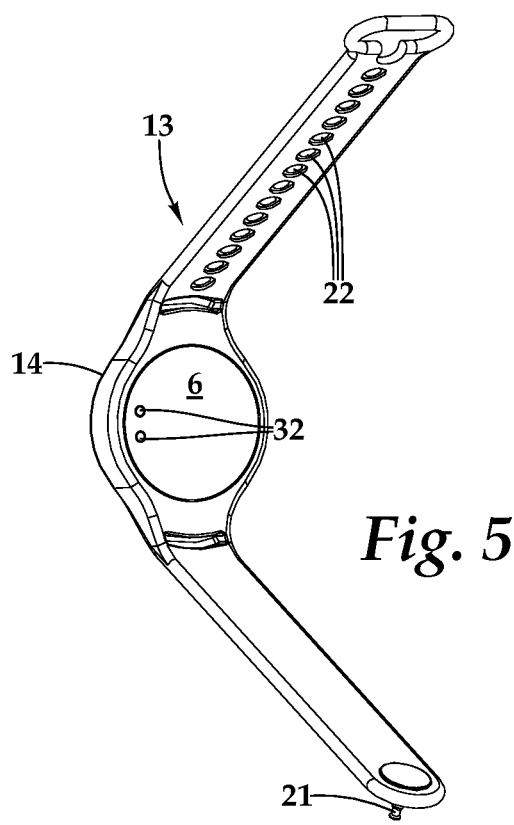
FIG. 5 is a rear perspective view of the wristband of the present invention shown with the module installed.
Figure 6:
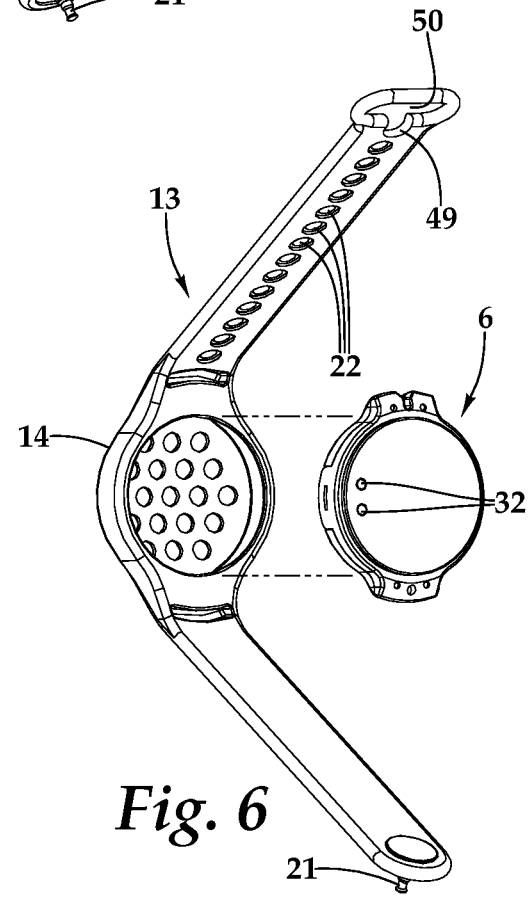
FIG. 6 is a rear perspective view of the wristband of the present invention shown with the module removed.

FIG. 5 is a rear perspective view of the wristband of the present invention shown with the module installed, and FIG. 6 is a rear perspective view of the wristband of the present invention shown with the module removed. As illustrated by these figures, the module 6 is configured to fit snugly within the center portion 14 of the wristband 13. The center portion 14 of the wristband 13 forms a pod into which the module 6 fits, and the side walls 14a of the pod encircle the module 6. The module itself comprises an LED 51 and a plurality of nodes 16 that extend outwardly from the front surface of the module 6 and are configured to fit through the holes 15 in the center portion 14 of the wristband 13. In a preferred embodiment, the nodes 16 and the holes 15 into which they protrude are evenly spaced on the front surface of the module 6 and cover nearly the entire front surface of the module. In the embodiment shown here, there are nineteen (19) notes on the front surface of the module 6; preferably, there are between five and twenty nodes.

The wristband 13 preferably comprises a cutout 49 extending inward from the aperture 50 formed at a distal end of the wristband 13 (opposite the pin 21). When the wristband is worn by a user, a first end of the wristband (that comprising the pin 21) is inserted into the aperture 50 and then tightened to fit the user's wrist. The optional cutout 49 facilitates the insertion of the pin 21 into the aperture 22.

Figure 7:
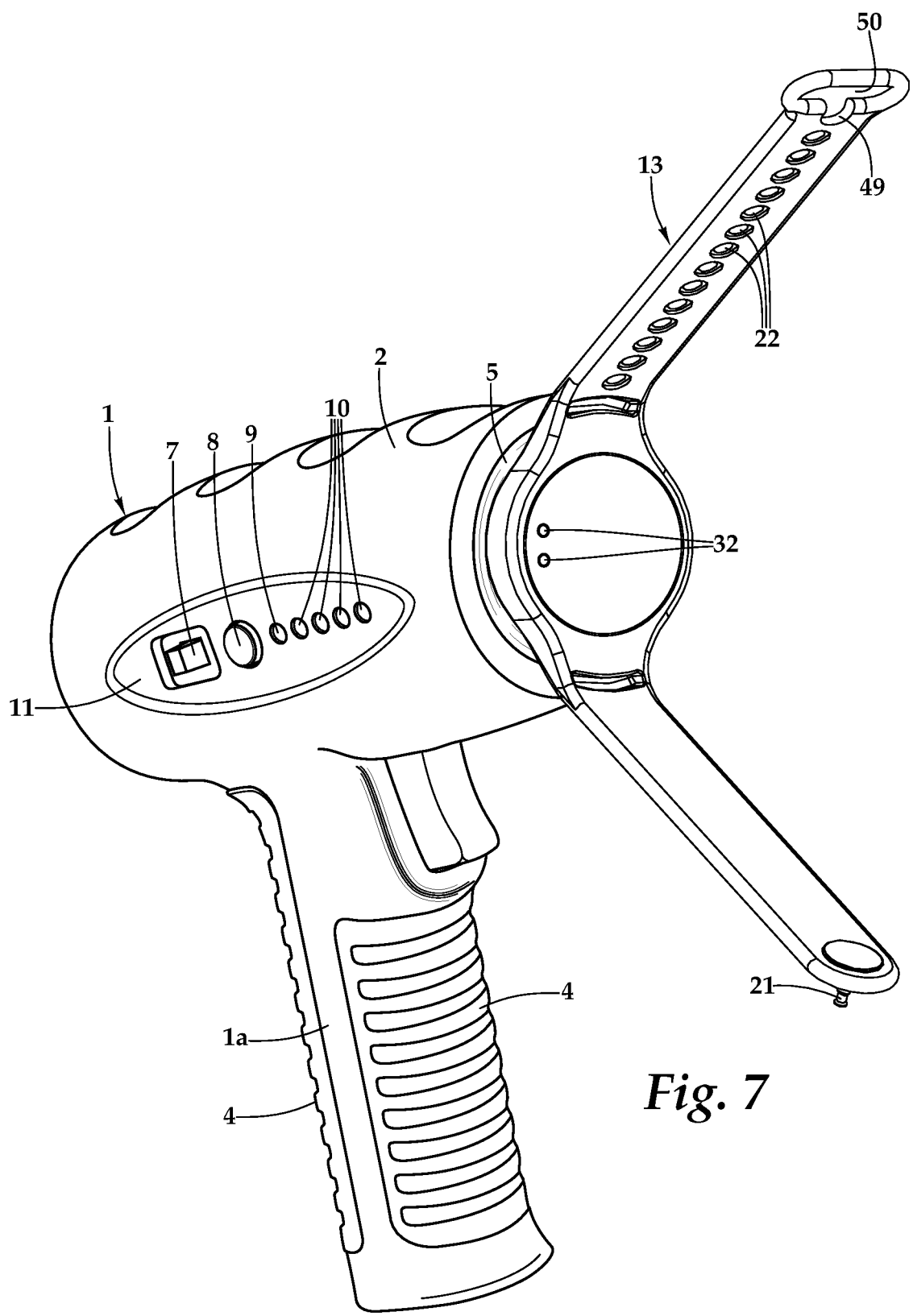
FIG. 7 is a perspective view of the handheld scanner of the present invention shown with the wristband in an activation position.

FIG. 7 is a perspective view of the handheld scanner of the present invention shown with the wristband in an activation position. In this figure, the convex outer surface of the center portion 14 of the wristband 13 has been placed up against the concave surface 5 at the front end of the body 2 of the handheld scanner 1. In this position, the module 6 is activated when the trigger 4a is pulled.

Figure 8A:
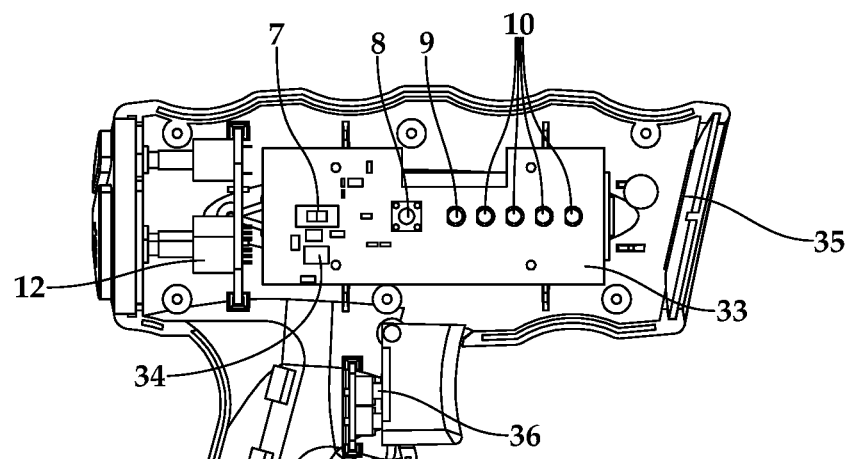
FIG. 8A is a detail view of a first side of the printed circuit board inside of the handheld scanner of the present invention.

FIG. 8A is a detail view of a first side of the printed circuit board inside of the handheld scanner of the present invention. As shown in this figure, the first side of the printed circuit board 33 comprises a charge IC 34, a first switch 7, an electricity meter/power button 8, and lights 9, 10. A first RFID antenna 35 is situated inside the front end of the scanner (inside the concave surface). Three timer set buttons 12 are situated inside the body housing between the printed circuit board and the rear end of the body 2. A second switch 36 is situated behind the trigger and communicates data to the wristband. A charge USB adapter 45 is located just inside the bottom end of the handle adjacent to the USB port 46.

Figure 8B:
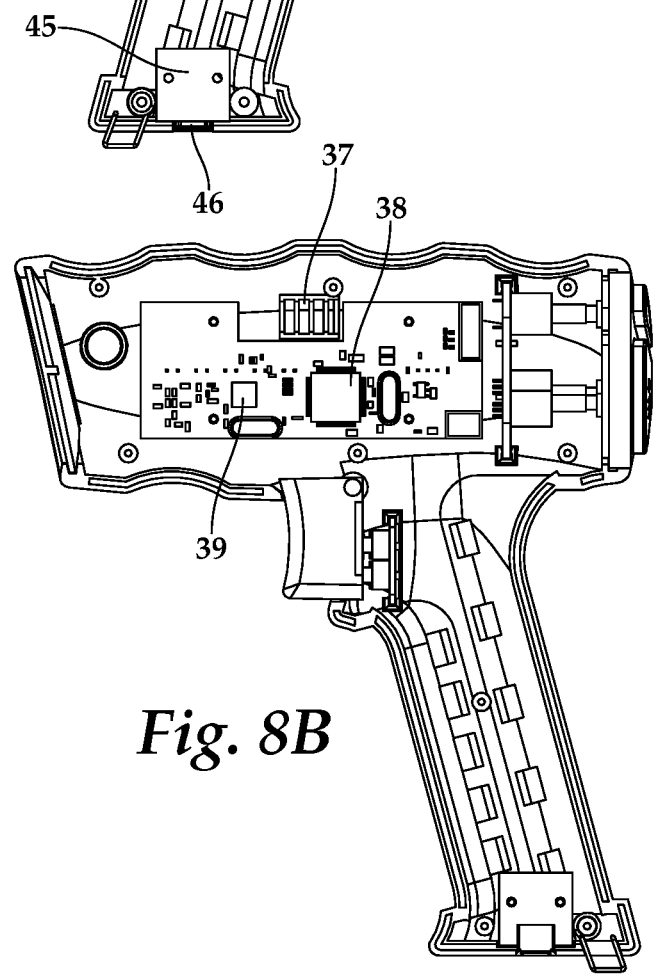
FIG. 8B is a detail view of a second side of the printed circuit board inside of the handheld scanner of the present invention.

FIG. 8B is a detail view of a second side of the printed circuit board inside of the handheld scanner of the present invention. As shown in this figure, a motor 37 is situated atop the center of the printed circuit board 33, which is oriented vertically as opposed to horizontally within the body 2. The second side of the printed circuit board 33 comprises a microcontroller unit 38 and an RFID reader/writer chip 39.

Figure 9A:
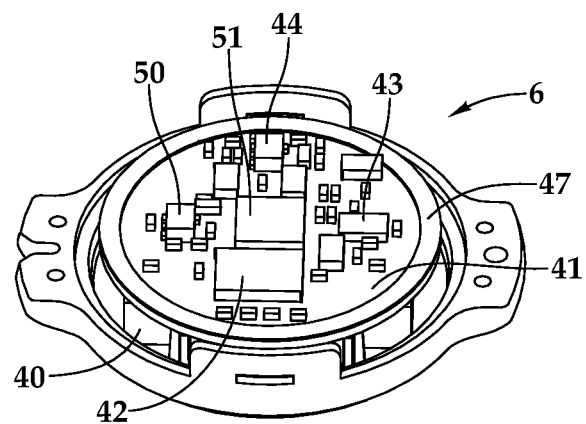
FIG. 9A is a perspective view of the printed circuit board inside of the module of the present invention.

FIG. 9A is a perspective view of the printed circuit board inside of the module of the present invention. As shown in this figure, the module 6 comprises a battery 40, and a printed circuit board 41. The side of the printed circuit board 41 that is shown in this figure faces outward when the wristband 13 is worn. The printed circuit board 41 comprises a microcontroller unit 42, an RFID tag chip 43, and a charge IC 44. It also comprises a power management chip 50 and a red and blue light emitting diode (LED) 51. A second RFID antenna 47, preferably in the shape of a ring corresponding to the perimeter of the module 6, sits inside of the module body but does not come into direct contact with the printed circuit board; rather, it is floating and connected to the printed circuit board by a base. Note that the RFID antenna 47 faces outwardly (in other words, it lies between the first polycarbonate plate 52 and the printed circuit board 41).

Figure 9B:
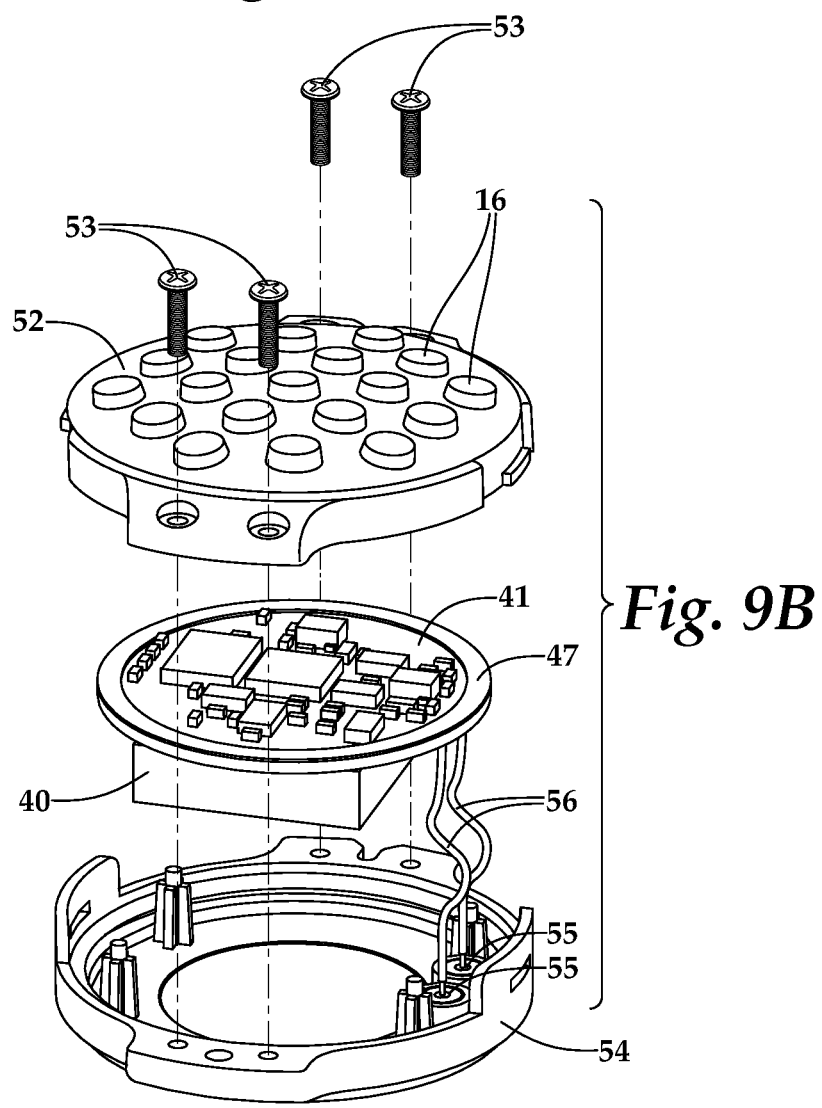
FIG. 9B is an exploded view of the module of the present invention.

FIG. 9B is an exploded view of the module of the present invention. A first polycarbonate plate 52 is situated on top of the printed circuit board 41 and comprises a plurality of upwardly extending nodes 16, which protrude through the holes 15 in the center portion 14 of the wristband 13, creating the impression of multiple LED lights. The first polycarbonate plate 52 is preferably translucent. A second polycarbonate plate 54 is situated beneath the printed circuit board 41 and battery 40. The first and second polycarbonate plates 52, 54 are held together with screws 53. As shown in this figure, metal contact pins 55 are molded into the second polycarbonate plate 54 and connected to the bottom surface of the printed circuit board 41 via wires 56.

Figure 10:
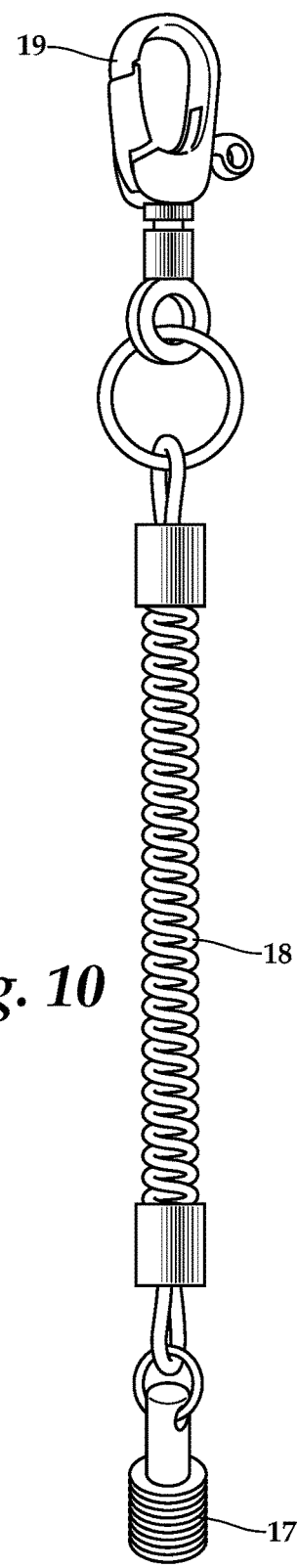
FIG. 10 is a perspective view of the activation key and cord of the present invention.

FIG. 10 is a perspective view of the activation key and cord of the present invention. This figure shows the magnetic key 17, which is shown here on the end of a plastic spring cord 18. The magnetic key 17 is on one end of the cord 18, and a clip 19 is on the other end of the cord. This key and cord would ordinarily be stored at the POS system so that a wristband could be unlocked from the docking station and placed on the wrist of a user at the time of payment. When the customer returns the wristband at the POS, the wristband is unlocked from the wrist of the user and placed back onto the docking station.

Figure 11:
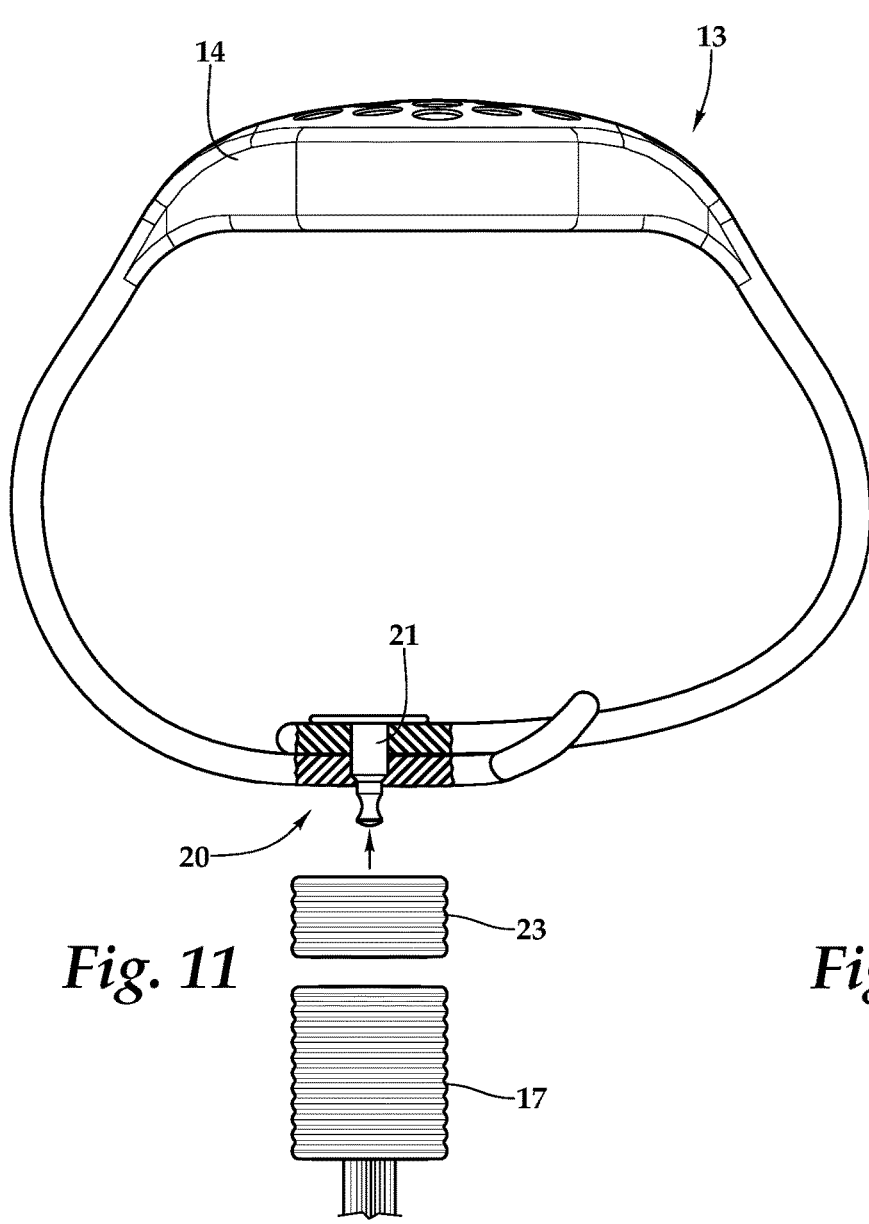
FIG. 11 is a side view of the wristband of the present invention shown in relation to the magnetic key.

FIG. 11 is a side view of the wristband of the present invention shown in relation to the lock. As shown in this figure, the first and second ends of the wristband 13 form a clasp 20. The clasp comprises a pin 21 that extends outwardly from a first end of the wristband 13 and an aperture 22 in the wristband 13 through which the steel pin 21 extends when the wristband is in a closed position. The clasp 20 is locked when the lock 23 is positioned over outward end of the pin 21. With the lock 23 in this position, the pin 21 cannot be removed from the lock because ball bearings 24 are situated within a circumferential concavity 21a in the outward end of the pin, and the internal lock housing 21b is configured to surround the ball bearings and prevent them from moving outwardly until and unless the platform 26 moves toward the lock ceiling 23a. The pin 21 and lock 23 are preferably made of aluminum, and the ball bearings 24 are made of steel.

Figures 12, 13, 14:
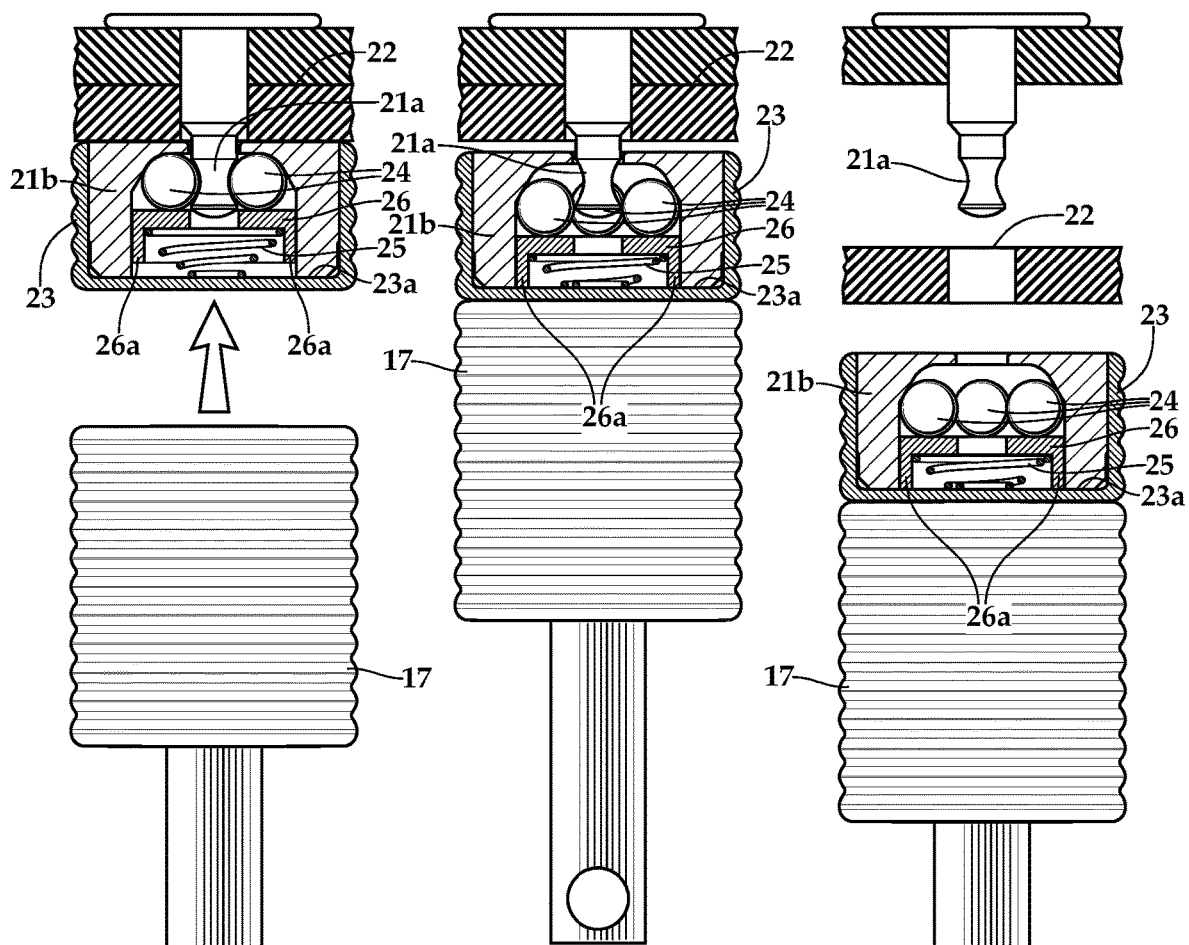
FIG. 12 is a section view of the wristband clasp shown in a locked position prior to engagement with the magnetic key.
FIG. 13 is a section view of the lock shown in engagement with the magnetic key.
FIG. 14 is a section view of the wristband clasp shown after the clasp has been unlocked.

FIG. 12 is a section view of the wristband clasp shown in a locked position prior to engagement with the magnetic key. As shown in this figure, the lock 23 comprises a plurality of metal ball bearings 24 that surround the outward end of the pin 21 (and fit into a circumferential concavity in the outward end of the pin 21) when it is inserted into the lock 23. The lock 23 further comprises an internal spring 25 and a platform 26 that is situated between the spring 25 and ball bearings 24.

FIG. 13 is a section view of the lock shown in engagement with the magnetic key. In this figure, the magnetic key 17, which comprises a flat top surface, is placed up against the flat top surface of the lock 23. In this position, the magnetic key 17 draws the ball bearings 24 toward the key and slightly outward, as permitted by the internal lock housing, thereby causing the platform 26 within the lock 23 to move toward the key 17 and compressing the spring 25 at the same time, until the platform legs 26a hit the ceiling 23a of the lock 23. The ball bearings 24 are drawn by magnetic force out of the circumferential concavity in the outward end of the pin 21, as shown in FIG. 12, and sit adjacent to the tip of the pin 21, as shown in FIG. 13. The pin 21 can now be pulled out of the lock 23.

FIG. 14 is a section view of the wristband clasp shown after the clasp has been unlocked. Once the pin 21 is pulled out of the lock 23, the clasp 20 can be unfastened by pulling the pin 21 through the aperture 22. Note that the ball bearings 24 remain in the position shown in FIG. 14 until the magnetic key 17 is removed from the lock 23. To lock the wristband, the outward end of the pin 21 is inserted into the lock 23 with the key 17 in the position shown in FIG. 14. When the lock 23 is removed from the key 17, the spring 25 pushes the platform 26 and the ball bearings 24 back into the position shown in FIG. 12.

Figure 15:
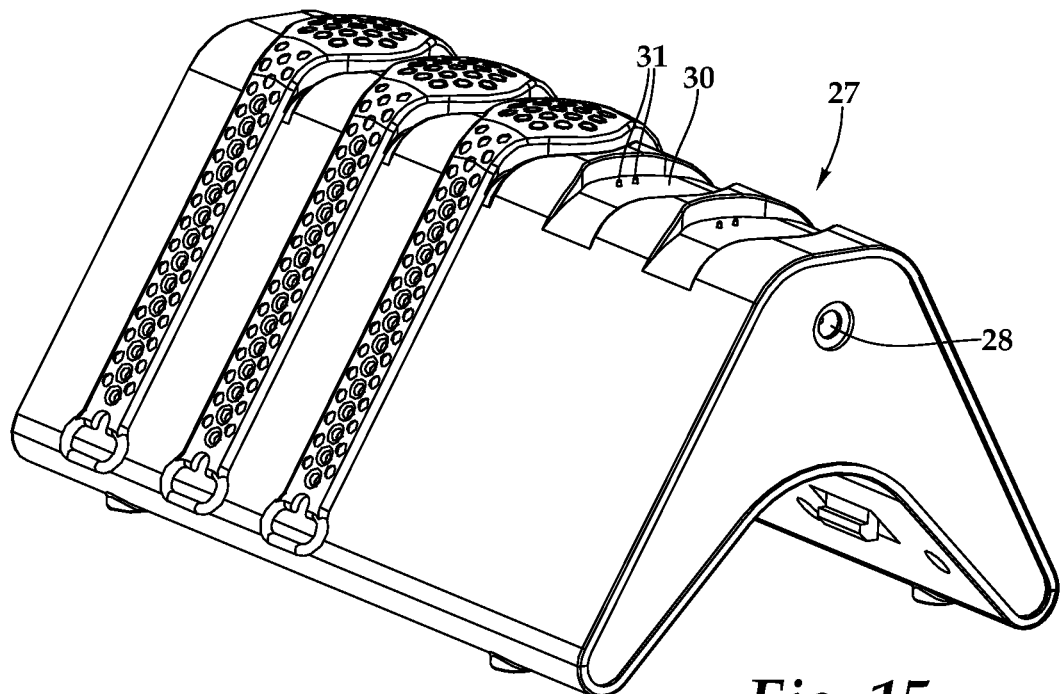
FIG. 15 is a top perspective view of the docking station of the present invention.

FIG. 15 is a top perspective view of the docking station of the present invention. As shown in this figure, the docking station 27 is preferably configured to support a plurality of individual wristbands 13. One end of the docking station 27 comprises a female electrical connector 28, and the other end of the docking station comprises a male electrical connector 29. These connectors 28, 29 enable multiple individual docking stations to be combined end-to-end to form a larger modular docking station (see FIG. 23). In one embodiment, the docking station 27 is shaped like an inverted "V" so that the center portion 14 of each wristband 13 rests on the apex of the "V." In another embodiment (not shown), the docking stations 27 is shaped like a rectangle with the center portion 14 of each wristband 13 resting on the top side of the rectangle. The top side of the docking station (in the case of the V-shaped embodiment, the top side is the apex of the "V") is preferably molded to provide a well 30 configured to receive the center portion 14 of the wristband 13. Each well comprises a pair of electrical conduits 31 that fit into a pair of electrical ports 32 on the rear side of the module 6 (see FIG. 5) for charging purposes. The wristbands 13 are held in place by friction induced by the tight fit of the well 30 to the main body of the wristband. Optionally, a magnet may be added to further secure the wristband on the docking station in case the TPE cover band wears out or gets too loose to stay depressed on the charge pins.

In a preferred embodiment, the outside diameter of the lock 23 is 13 millimeters (mm), and the outside diameter of the base of the pin 21 is 2 mm. The ball bearings 24 are preferably 2.5 mm in diameter, which is the smallest diameter bearings that are currently available on the market. In a preferred embodiment, the ratio of the outside diameter of the lock 23 to the outside diameter of the base of the pin 21 (that is, that part of the pin 21 that is situated inside of the wristband 13) is approximately 6.5:1. The first polycarbonate plate 52 and second polycarbonate plate 54 have the same outside diameter, and that outside diameter is preferably 37 mm. The inside diameter of the center portion 14 of the wristband 13 is preferably 28 mm. The TPE material that comprises the wristband is preferably 2.5 mm in thickness. In a preferred embodiment, the ratio of the outside diameter of the module to the inside diameter of the center portion of the wristband is approximately 1.3:1. All of these values have been engineered to optimize the fit and functionality of the present invention. By virtue of the specific fit between the module 6 and the center portion 14 of the wristband 13, as well as the Shore hardness of the TPE material, the module 6 may be inserted into the wristband and held in place without the need for any fasteners or locking mechanisms.

Figure 16:
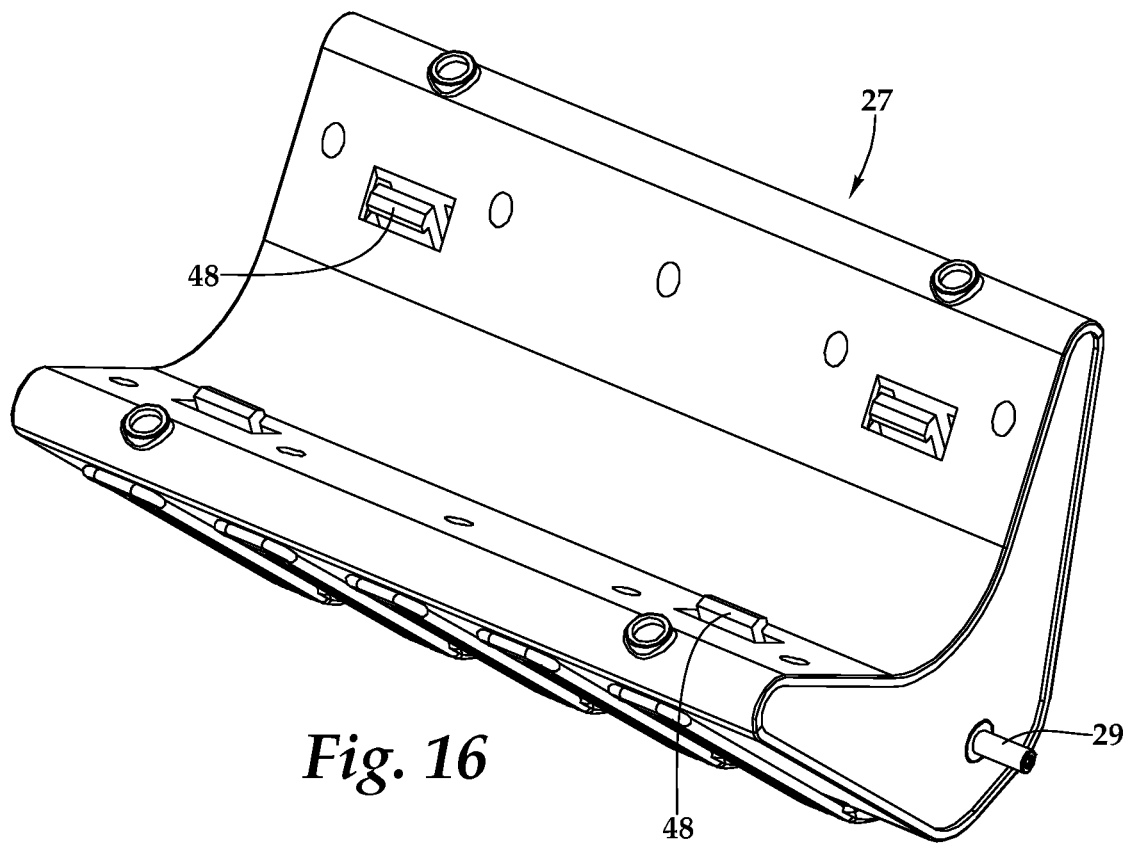
FIG. 16 is a bottom perspective view of the docking station of the present invention.
Figure 23:
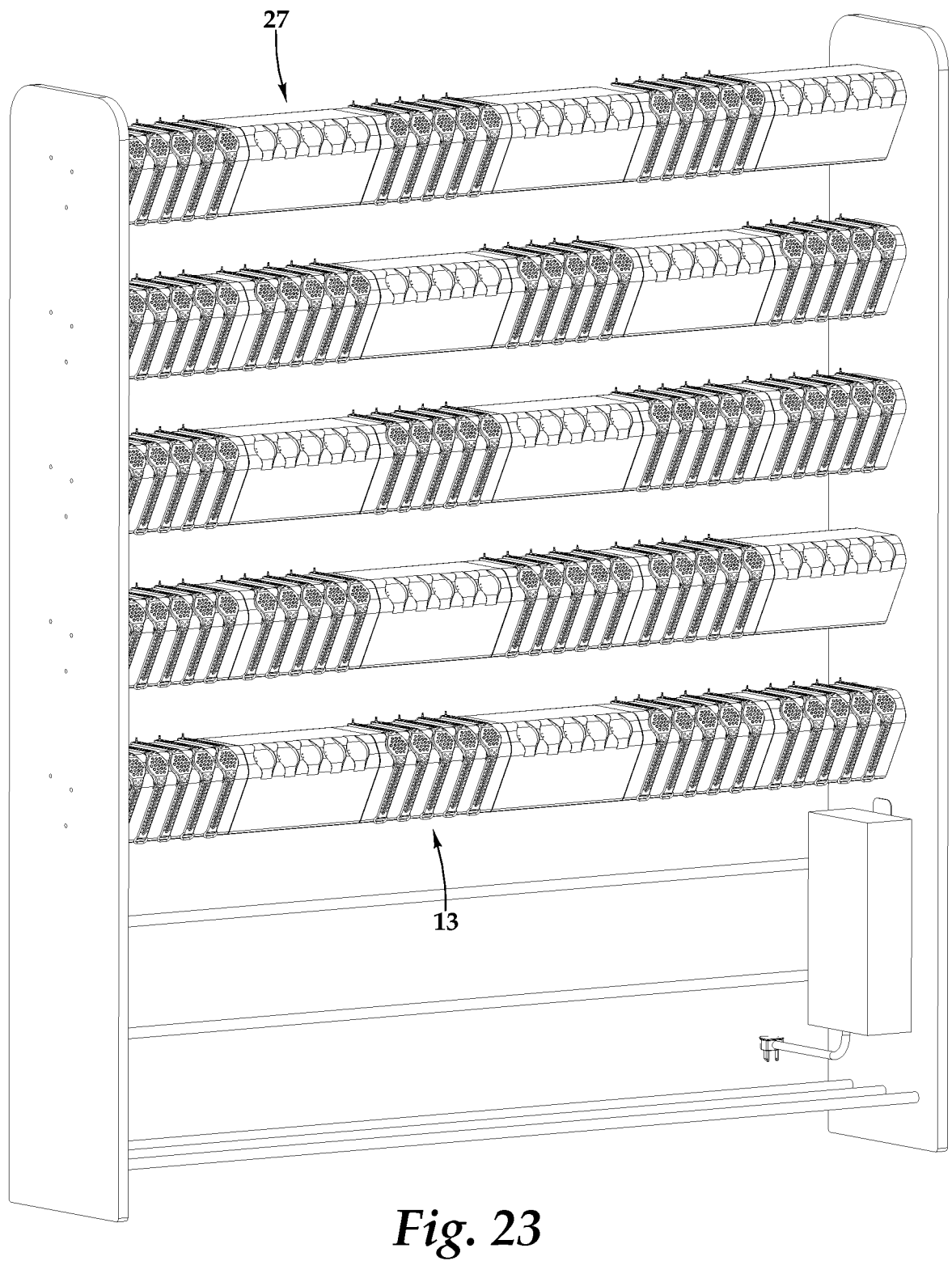
FIG. 23 is a perspective view of an aggregate (modular) docking station comprised of multiple individual docking stations.

FIG. 16 is a bottom perspective view of the docking station of the present invention. Brackets 48 on the underside of the docking station enable the docking station to be attached to a frame, as shown in FIG. 23.

Figure 17:
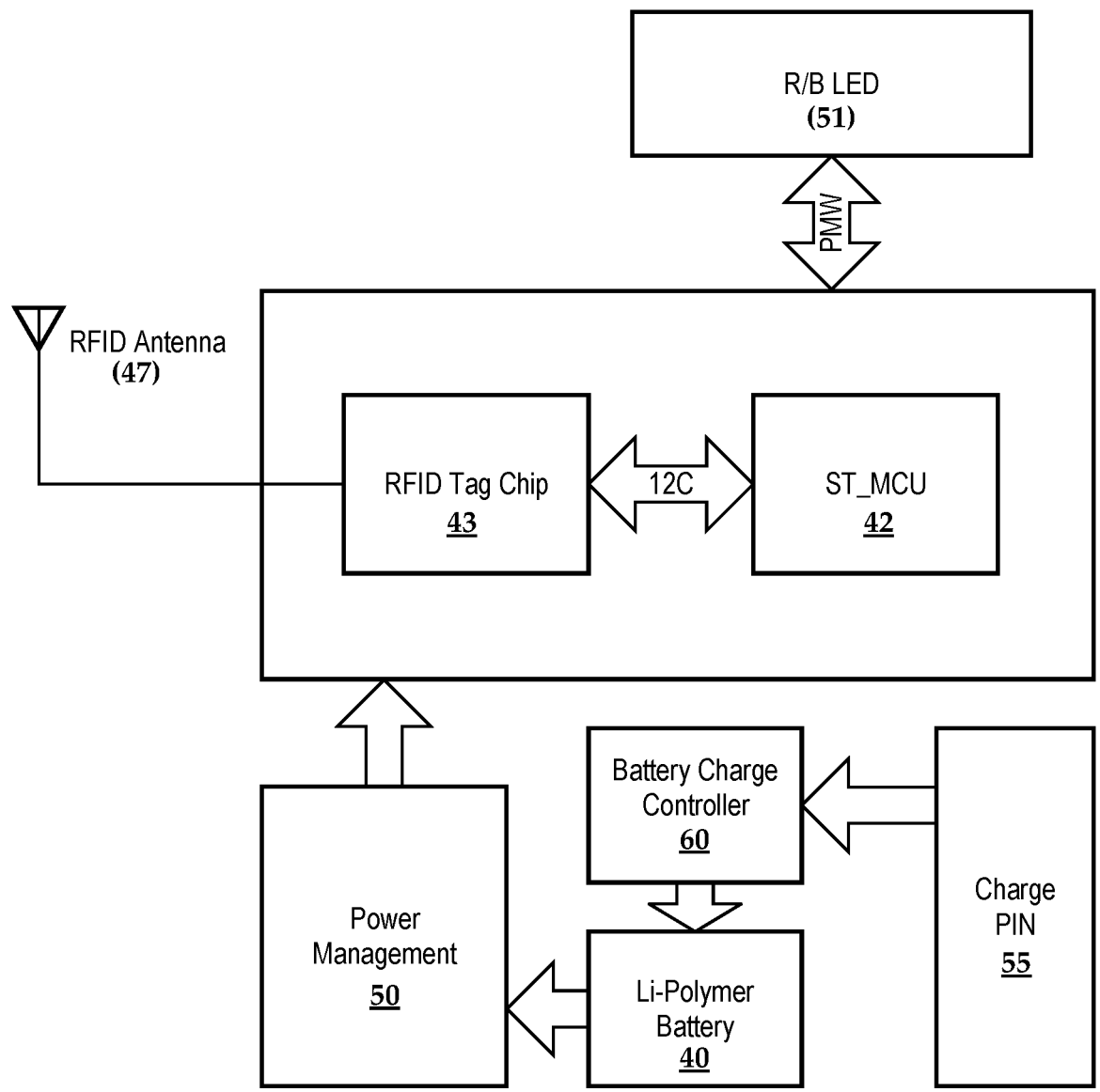
FIG. 17 is a block diagram of the hardware of the present invention.

FIG. 17 is a block diagram of the module hardware of the present invention. The present invention is comprised of several hardware and software elements that enable the functionality of a POS software program to activate via near field communication (NFC) technology a custom wearable electronic device (the module 6 and wristband 13) that has programmable time indicator/management functionality. As noted above, the present invention allows a business to sell services and activities based on "purchased time of use" and to manage customers' usage of such services and activities on a real-time basis. As shown, the invention preferably comprises a battery charge controller to maintain the proper voltage required to charge the battery 40; it also monitors when charging is complete. Once the battery is fully charged, the charging process ends so that there is no risk of overcharging the battery.

Figure 18:
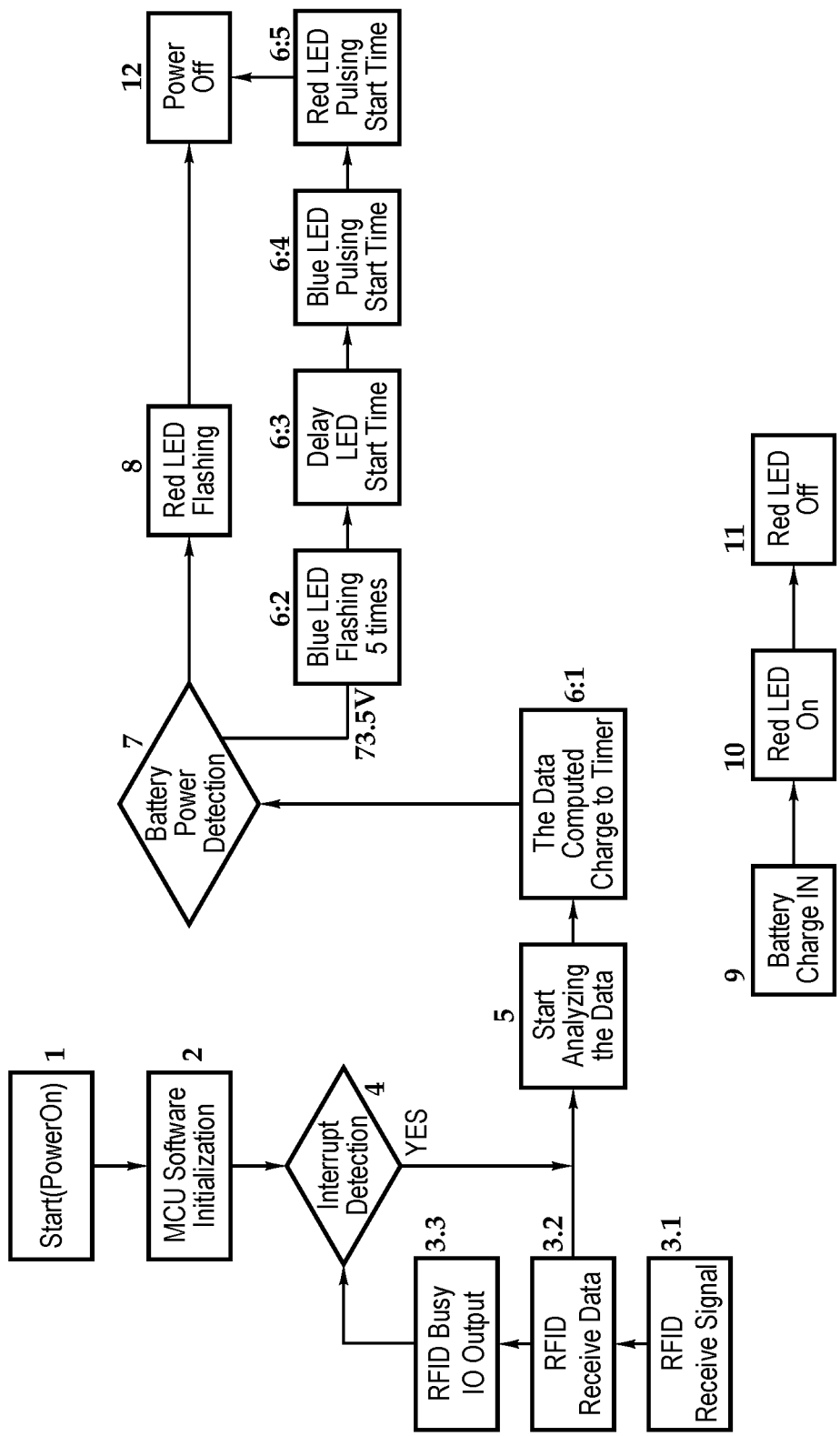
FIG. 18 is a block diagram of the software of the present invention.

FIG. 18 is a block diagram of the module software of the present invention. At step 1, the microcontroller power is turned on (reset and start). At step 2, the microcontroller software is initialized, and the inter-integrated circuit (I2C) and program line input/output (PIO) interrupts are activated. At step 3:1, the RFID antenna 47 receives a wireless command signal from either the POS system or the handheld scanner. At step 3:2, the RFID chip 43 receives data from either the RFID reader/writer that is connected to the POS system or the RFID reader/writer on the handheld scanner. At step 3:3, busy IO (which notified the microcontroller to receive the data RFID signal) progresses to high level.

At step 4, the microcontroller unit receives the correct interrupt signal and proceeds to read the RFID tag chip data (step 5). At step 6:1, the data received activates the timer accordingly and initiates LED sequence of lighting as follows: rapid 5× blue LED flash for confirmation of initiation (step 6:2); delay start time (step 6:3), pulsing blue LED for activity time (step 6:4), and flashing red LED for time end (step 6:5). The final step 12 is power off. Note that each time sequence for the operation has variable time and can be programmed by the POS system or defined by a stand-alone hardware device (such as the portable scanner shown in FIGS. 1 and 2) with preset commands.

If the system is activated and the detected battery voltage is more than 3.5V (step 7), then the confirmation of initiation rapid 5× blue LED flashing sequence will start (step 6:2) and will continue with the command sequence until completion. If the system is activated and the detected battery voltage is less than 3.5V, then low power status will be activated, and a pulsating red light will result (step 8) and will continue until the module is placed on the docking station 27 for charging or until the light is off and the battery is completely drained. When the module/wristband is placed onto the docking station (step 9), the module will emit a continuous red light (step 10) until it is fully charged, at which point the light will automatically turn off (step 11).

Figure 19:
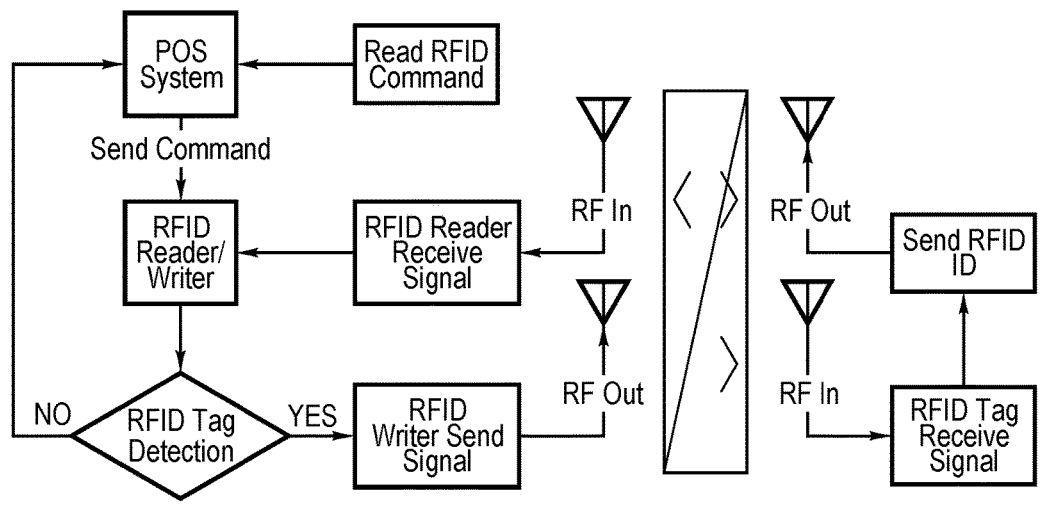
FIG. 19 is a block diagram of the point of sale system RFD detection functionality of the present invention.

FIG. 19 is a block diagram of the point of sale system RFID detection functionality of the present invention. Note that this figure is applicable only when the module is activated by the POS system (it would not be applicable if the module is activated by the handheld scanner). Each module has its own RFID universal unique identifier (UUID) that cannot be modified or altered. Prior to initiation of pre-purchased time, the POS reads the module ID and matches its activities inside the venue to an individual customer. Communication between the RFID reader/writer and the module occurs through standard RFID protocols. As shown in this figure, a read command is issued via the POS to the RFID reader/writer. The wristband is placed on top of a stand-alone RFID reader/writer that is connected to a PC, and the module's RFID UUID is detected by the system. The RFID information is then processed according to the POS software program.

Figure 20:
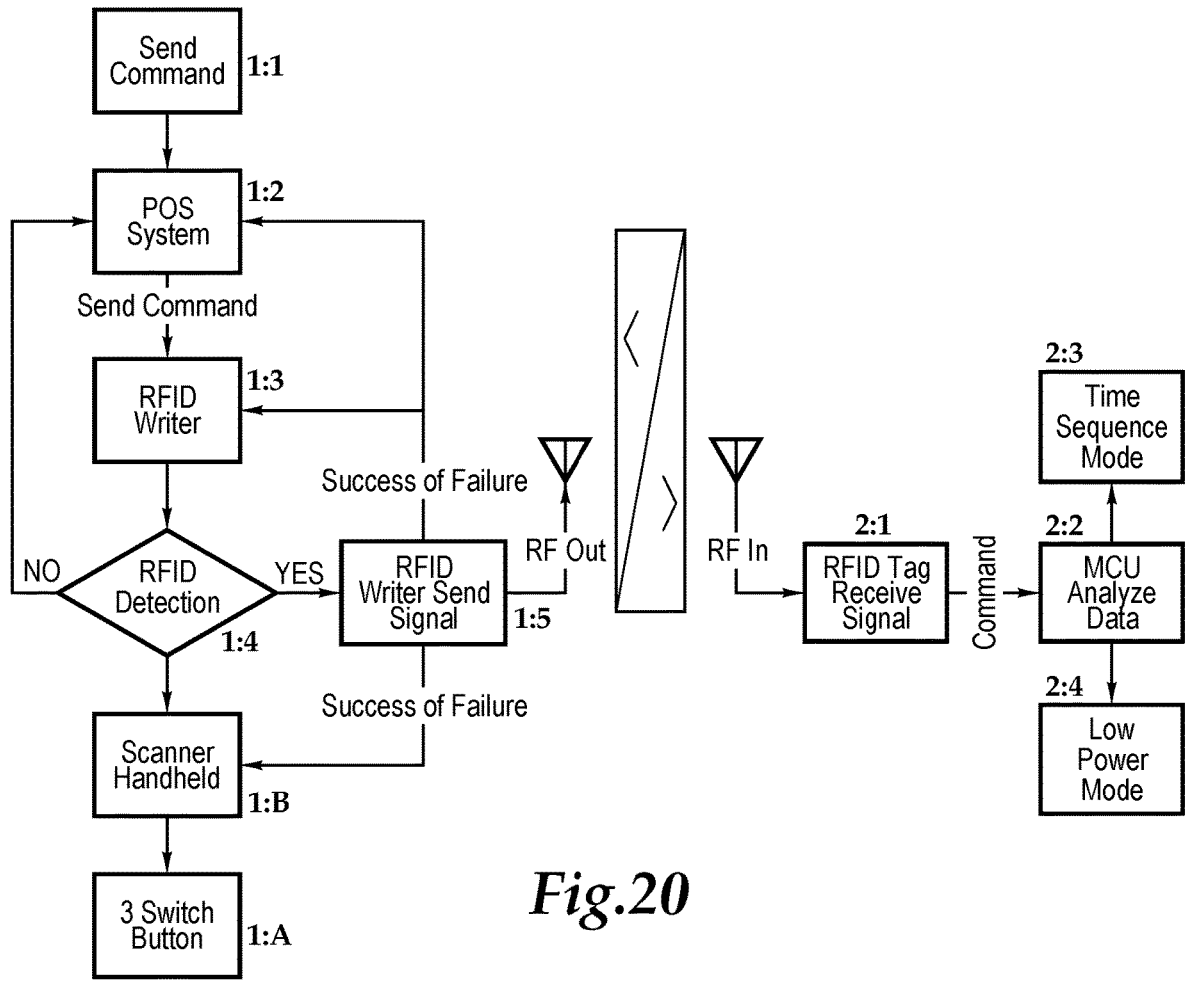
FIG. 20 is a block diagram of the point of sale system send LED command functionality of the present invention.

FIG. 20 is a block diagram of the point of sale system send LED command functionality of the present invention. The module is activated by either the POS system (steps 1:2, 1:3) via an RFID reader/writer that is connected to a PC computer or by a portable (handheld) scanner, as shown in FIGS. 1 and 2. The user's activity time is set through the user interface of the PUS system (step 1:1) via a wireless command from the RFID reader/writer (step 1:3) to the module (step 2:1). Once information is relayed, then the microcontroller unit will process the data and activate the LED protocols accordingly. Alternately, the modules may also be activated by a portable scanner (step 1:B) with preset time buttons (step 1:A).

Figure 21:
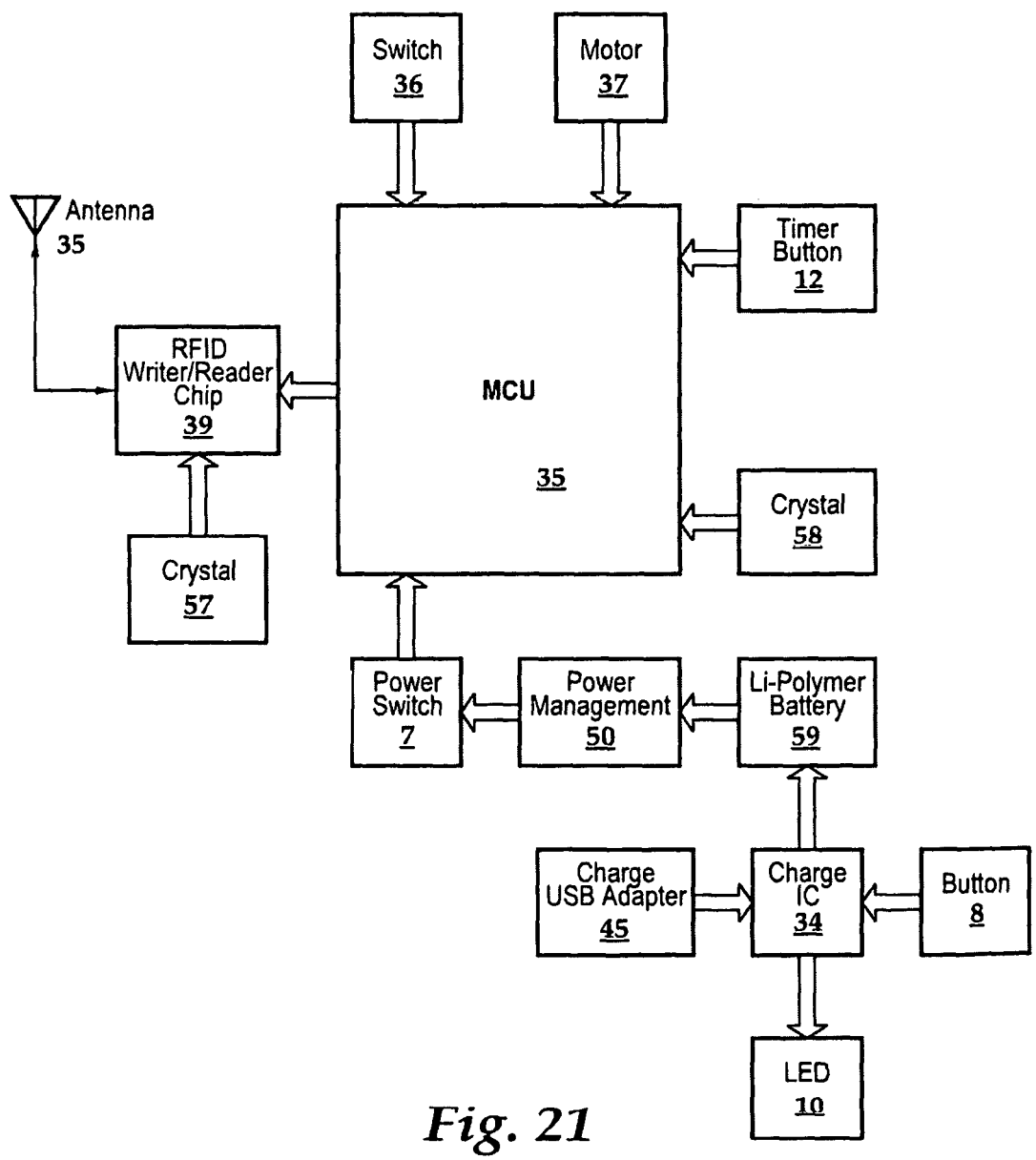
FIG. 21 is a block diagram of the RFID handheld scanner hardware of the present invention.

FIG. 21 is a block diagram of the RFID handheld scanner hardware of the present invention. Timer button 12 selection determines the preset time (three options) for the microcontroller unit 38 to process once the first switch 7 is activated. When the second switch 36 is engaged, the microcontroller unit 38 activates the RFID reader/writer chip 39 to transmit and receive commands via an antenna 35 that uses a standard RFID standard frequency. The RFID reader/writer chip 39 requires a first crystal oscillator 57 to function for time-based application. The microcontroller unit 38 also controls a motor 37 that allows for haptic feedback as to whether signal transmission was successful. When the signal is successfully transmitted, the motor 37 is activated for three continuous seconds. if transmission is unsuccessful, the motor 37 will pulse for two seconds so that the user is notified via touch. The microcontroller unit 38 also requires a second crystal oscillator 58 for time-based command functions. When the scanner is not being used, there is a power switch 7 that can be turned off to save battery levels. A rechargeable lithium polymer battery 59 is used to power the scanner, and a power management regulator 50 is used to maintain consistent voltage. A charge IC 34 manages the recharging of the lithium polymer battery through a standard DC +5V USB connector and also allows for LED indicators 10 (not shown) to display current battery levels when button 8 is pushed.

Figure 22:
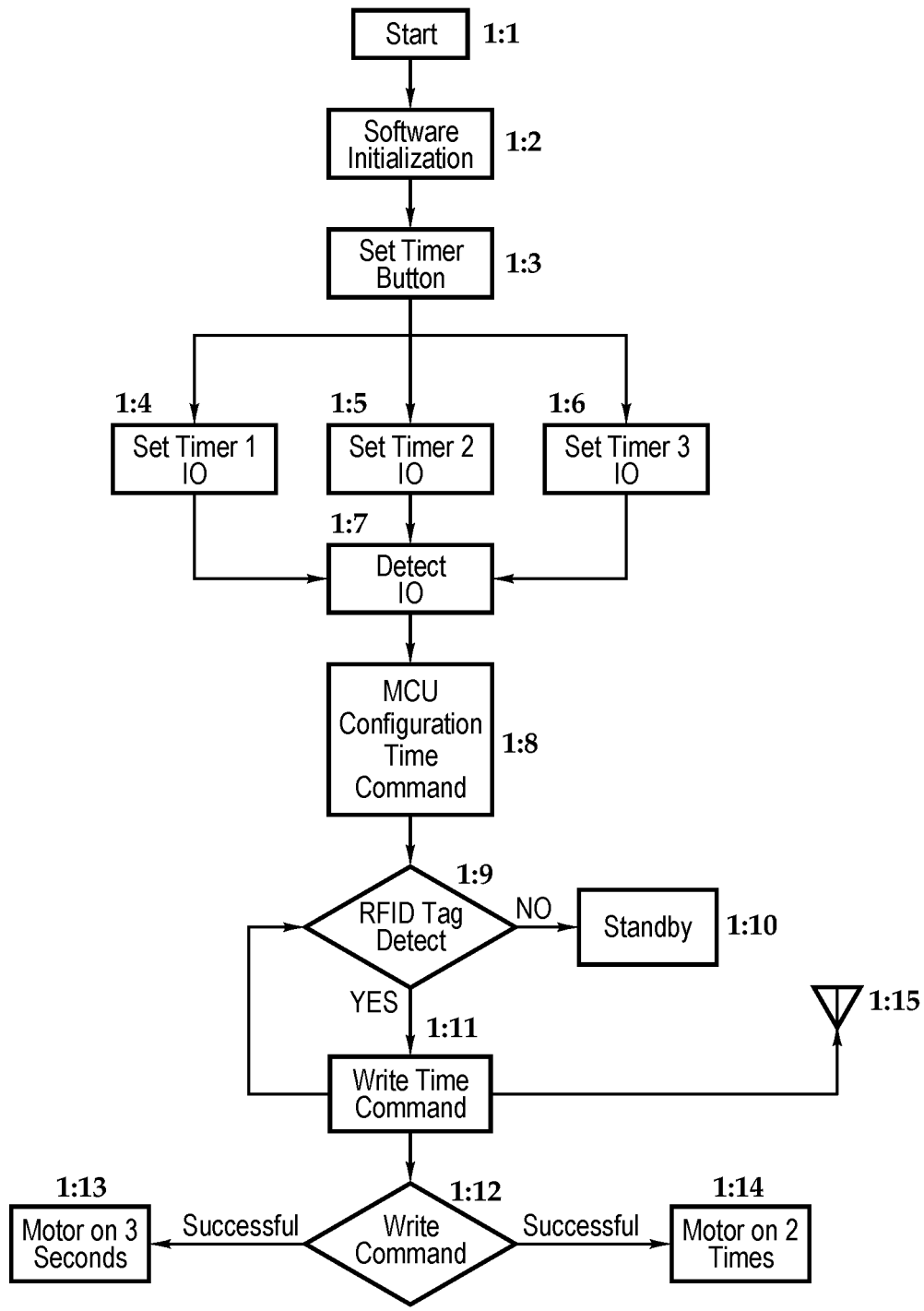
FIG. 22 is a block diagram of the RFID scanner microcontroller unit software of the present invention.

FIG. 22 is a block diagram of the RFID scanner microcontroller unit software of the present invention. When powered on (step 1:1), software on the RFID scanner initializes, and the unit becomes operational (step 1:2). Depending on which of the set timer buttons is activated (step 1:3), the microcontroller unit will detect 10 (step 1:7) and RFID tag (step 1:9), and then the microcontroller unit will process (step 1:8) and initiate the correct time command signal to the RFID tag (on the printed circuit board of the module) when the trigger button is activated (step 1:11). If no RFID-compatible tag is detected, the system will revert to standby mode (step 1:10). If there is a compatible RFID tag, then a time command signal is sent through the RFID antenna (step 1:15). If the RFID tag receives the signal, there is a confirmation that activates the motor accordingly (step 1:12) as processed (three seconds on) (step 1:13). If the signal does not go through, then there is a different motor feedback (two pulse signals) (step 1:14).

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A system for management of admission to venues that charge by time comprising:
   (a) a handheld scanner;
   (b) a wristband;
   (c) a module;
   (d) a magnetic key; and
   (e) a magnetic lock;
   wherein the wristband is comprised of a flexible, thermoplastic elastomer material;
   wherein the wristband comprises a center portion that forms a pod that is configured to receive the module;
   wherein the module comprises a first polycarbonate plate and a second polycarbonate plate;
   wherein the wristband contains a plurality of holes corresponding in number and size to a plurality of nodes on an outer surface of the first polycarbonate plate;
   wherein the module comprise an LED;
   wherein the handheld scanner comprises a first RFID antenna;
   wherein the module comprises a second RFID antenna;
   wherein the handheld scanner is configured to transmit data to the module, and the module is configured to receive data from the handheld scanner;
   wherein the handheld scanner comprises two or more timer buttons;
   wherein each timer button corresponds to a preset duration of time;
   wherein, depending on which timer button is activated, the handheld scanner sends a particular time command signal to the module; and
   wherein the magnetic lock and the magnetic key are configured to lock and unlock the wristband on a wrist of a user.

2. The system of claim 1, further comprising a docking station;
   wherein the docking station is configured to support a plurality of wristbands;
   wherein the docking station comprises a first end, a second end, and a top side;
   wherein the first end of the docking station comprises a female electrical connector;
   wherein the second end of the docking station comprises a male electrical connector;
   wherein the top side of the docking station is configured to provide a plurality of wells;
   wherein each well is configured to receive the center portion of the wristband; and
   wherein each well comprises a pair of electrical conduits that are configured to fit into a pair of electrical ports on a rear side of the module for charging purposes.

3. The system of claim 1, wherein the handheld scanner comprises a housing with a front end having a concave surface; and
   wherein an outer surface of the center portion of the wristband is convex in shape and configured to correspond in shape and size to the concave surface of the front end of the housing of the handheld scanner.

4. The system of claim 3, wherein the housing of the handheld scanner comprises a first side and a second side;
   wherein the first side of the housing comprises a belt clip; and wherein the second side of the housing comprises a power switch, a charge button, a power indicator light, and a plurality of battery power level indicator lights.

5. The system of claim 4, wherein the power switch, the charge button, the power indicator light, and the plurality of battery power level indicator lights are situated within a recess in the second side of the handheld scanner.

6. The system of claim 3, wherein the handheld scanner comprises a body and a handle; and
wherein the timer buttons are situated on a rear end of the body of the handheld scanner.

7. The system of claim 6, wherein the handheld scanner comprises a printed circuit, board;
wherein the primed circuit board has a first side and a second side;
wherein the first side of the printed circuit board comprises a charge IC, a first switch, a power button, and a plurality of indicator lights;
wherein the handheld scanner further comprises a motor that is situated atop the printed circuit board;
wherein the second side of the printed circuit board comprises a microcontroller unit and an RFID reader and/or writer chip; and
wherein the first RFID antenna is situated inside the front end of the housing directly behind the concave surface.

8. The system of claim 6, wherein a bottom end of the handle comprises a USB port; and
wherein the handheld scanner further comprises a USB adapter located inside the bottom end of the handle, adjacent to the USB port.

9. The system of claim 1, wherein the pod comprises side walls; and
wherein the side walls of the pod encircle the module.

10. The system of claim 1, wherein the thermoplastic elastomer material of the wristband has a hardness rating of Shore 80A.

11. The system of claim 1, wherein the module comprises a battery and a printed circuit board;
wherein the printed circuit board has a first side and a second side;
wherein the first side of the printed circuit board comprises a microcontroller unit, an RFID tag chip, a charge IC, a power management chip, and a light emitting diode;
wherein the second RFID antenna is in the shape of a ring corresponding to a perimeter of the module; and
wherein the second RFID antenna is situated inside the module between the first polycarbonate plate and the printed circuit board.

12. The system of claim 11, wherein the second polycarbonate plate forms a rear side of the module; and
wherein the rear side of the module comprises a pair of electrical ports for charging the battery of the module.

13. The system of claim 11, wherein metal contact pins are molded into the second polycarbonate plate; and
wherein the metal contact pins are connected to a bottom surface of the printed circuit board with wires.

14. The system of claim 1, wherein the first polycarbonate plate is translucent.

15. The system of claim 1, wherein the wristband comprises a first end and a second end;
wherein the first end and the second end of the wristband are configured to form a clasp;
wherein the clasp comprises a pin that extends outwardly from the first end of the wristband;
wherein the wristband comprises a plurality of apertures extending from the center portion of the wristband to the second end of the wristband; magnetic
wherein the magnetic lock comprises a plurality of ball bearings that are situated within a circumferential concavity in an outward end of the pin when the clasp is in a locked position;
wherein the magnetic lock further comprises an internal lock housing, a platform, a lock ceiling, and an internal spring;
wherein the platform is situated between the spring and the ball bearings;
wherein the platform is configured to move within the magnetic lock and compress the spring when the ball bearings are drawn magnetically to the magnetic key;
wherein the spring is configured to exert pressure on the platform, thereby moving the ball bearings away from the lock ceiling when the magnetic force of the magnetic key is removed; and
wherein the internal lock housing is configured to surround the ball bearings and prevent them from moving outwardly until and unless the platform moves toward the lock ceiling.

16. The system of claim 15, wherein the magnetic lock has an outside diameter;
wherein the pin has a base with an outside diameter; and
wherein the ratio of the outside diameter of the magnetic lock to the outside diameter of the base of the pin is 6.5:1.

17. The system of claim 1, wherein the module has an outside diameter;
wherein the center portion of the wristband has an inside diameter; and
wherein the ratio of the outside diameter of the module to the inside diameter of the center portion of the wristband is 1.3:1.

18. The system of claim 1, wherein the module further comprises a computing system that is programmed to cause the LED of the module to display preset light sequences based on time periods corresponding to the timer buttons.

* * * * *